US007358204B2

(12) United States Patent
Brennan

(10) Patent No.: US 7,358,204 B2
(45) Date of Patent: Apr. 15, 2008

(54) SOFT, THICK, NON-LINTING NONWOVEN

(75) Inventor: Jonathan Paul Brennan, Cincinnati, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 713 days.

(21) Appl. No.: 09/824,454

(22) Filed: Apr. 2, 2001

(65) Prior Publication Data

US 2001/0036787 A1 Nov. 1, 2001

Related U.S. Application Data

(60) Provisional application No. 60/196,972, filed on Apr. 13, 2000.

(51) Int. Cl.
*D04H 1/00* (2006.01)
*D04H 3/00* (2006.01)
*D04H 13/00* (2006.01)
*A47K 7/00* (2006.01)
*A47L 13/16* (2006.01)

(52) U.S. Cl. .................. 442/382; 15/208; 442/361; 442/366; 442/389; 442/391; 442/392; 442/409; 604/358; 604/367; 604/384

(58) Field of Classification Search .............. 442/301, 442/361–366, 381–385, 391–392; 15/208; 604/358, 367, 384
See application file for complete search history.

(56) References Cited

U.S. PATENT DOCUMENTS

| 5,505,719 | A | * | 4/1996 | Cohen et al. | 604/372 |
| 5,804,512 | A | * | 9/1998 | Lickfield et al. | 442/346 |
| 5,883,026 | A | * | 3/1999 | Reader et al. | 442/382 |
| 6,333,093 | B1 | * | 12/2001 | Burrell et al. | 428/194 |

* cited by examiner

*Primary Examiner*—Terrel Morris
*Assistant Examiner*—Jennifer A Chriss
(74) *Attorney, Agent, or Firm*—Eric T. Addington; Richard L. Alexander; Matthew P. Fitzpatrick

(57) ABSTRACT

The nonwoven web 10 of the present invention is a layered structure that takes advantage of the beneficial properties of different types of fibers advantageously distributed in each layer. In particular, the present invention is a multi-layer nonwoven web suitable for use as a wet wipe, the web having a first fibrous outer layer comprising from about 10% to about 60% conjugate fiber, from about 10% to about 90% cellulosic fibers, a fibrous inner layer bonded at discrete bond sites to the first outer layer in a face to face relationship comprising from about 10% to about 60% conjugate fiber, and from about 10% to about 65% cellulosic fibers. A second fibrous outer layer, which can be the same composition as the first outer layer, is bonded at discrete bond sites to the inner layer in a face to face relationship. A method for forming the web of the present invention is also disclosed.

6 Claims, 1 Drawing Sheet

SOFT, THICK, NON-LINTING NONWOVEN

This Patent Application claims priority to Provisional Patent Application Ser. No. 60/196,972, filed Apr. 13, 2000.

FIELD OF THE INVENTION

The present invention is related to nonwoven materials. In particular, the present invention is related to soft, thick, and non-linting nonwoven materials suitable for use as a substrate for pre-moistened wipes.

BACKGROUND OF THE INVENTION

Nonwoven fabrics are desirable for use in a variety of products such as bandaging materials, garments, disposable diapers, and other personal hygiene products, including pre-moistened wipes. Pre-moistened wipes are often packaged as discrete wipes in a stack in a moisture proof container, and are often referred to as wet wipes. Wet wipes are commonly used as baby wipes for the cleaning of a baby's skin during a diaper change.

Nonwoven fabrics having high levels of strength, thickness, drape, and softness are desirable for body-contacting articles, such as linings for disposable diapers and wet wipes. However, optimizing all the desirable properties is often not possible. For example, often a balance of properties results in less than desirable softness or strength levels. Wet wipes used as baby wipes, for example, should be strong enough when wet to maintain integrity in use, but soft enough to give a pleasing and comfortable tactile sensation to the user(s). In addition they should have fluid retention properties such that they remain wet during storage, and sufficient thickness and porosity to be effective in cleaning the soiled skin of a user.

Strength in a nonwoven fabric can be generated by a variety of known methods. If thermoplastic fibers are used, strength can be imparted by melting, either by through-air bonding or by hot roll calendaring. Hydroentangling fibers in a spunlace operation and adhesive bonding are also commonly used to bind fibers to increase the strength of the nonwoven. However, these processes, while increasing the strength of the nonwoven, generally detract from other desirable properties. For example, thermal bonding is effective at maintaining the thickness (bulk) of the nonwoven, but maintaining a relatively soft product suitable for wet wipes requires the use of relatively expensive conjugate fibers throughout the nonwoven web. The use of conjugate fibers throughout the nonwoven can also negatively affect the drape of the resulting material.

Hydroentangling a fibrous structure generates strength, but typically reduces the thickness of the material. Such a reduction in thickness is undesirable in a wet wipe application. Due to the nature of cleaning tasks for which wet wipes are used, consumers prefer a wipe that has a minimum amount of apparent bulk, or thickness associated with it. To increase the basis weight of the starting material such that after hydroentangling the material retains sufficient thickness to be used as a baby wipe would be prohibitively expensive.

Adhesive bonding can be used to generate sufficient strength, especially in a carded web. However, adhesive adds to the expense of the resulting web, often costing more than the fibers of the base web to which it is applied. Additionally, the presence of adhesive can negatively impact the fragrance and preservative ingredients in a wet wipe. Adhesive application systems also add cost and complexity to a nonwoven manufacturing process, as well as creating hygiene problems in the application equipment and other equipment in the vicinity. Finally, adhesive can contribute to the stiffness of the final nonwoven, which lowers the drape and perceived softness of the material.

In addition to the attributes of relatively high strength, drape, and softness, another property desirable in a nonwoven suitable for a wet wipe is relatively low linting. Linting, or pilling, occurs as fibers, or small bundles of fibers, are pulled off, or otherwise released from, the surface of the nonwoven substrate of the wet wipe. Linting results in fibers remaining on the skin of the user, a highly undesirable condition for wet wipe users. Linting can be controlled in much the same way that strength is imparted. That is, to the extent that fibers of the nonwoven are bonded to, or entangled with, one another, linting levels can be controlled. Therefore, by increasing the level of adhesive in a carded web, for example, linting can be decreased. However, as mentioned above, the increased level of adhesive contributes to greater stiffness and decreased levels of softness.

Accordingly, it would be desirable to have a soft, thick nonwoven web suitable for use as a wet wipe, and having suitable strength to maintain structural integrity during use.

Additionally, it would be desirable to have a soft, thick nonwoven web suitable for use as a wet wipe for effective skin soil cleaning.

Additionally, it would be desirable to have a thick and soft nonwoven web suitable for use as a wet wipe exhibiting relatively low levels of linting without the use of stiffness-increasing additives, such as the addition of adhesive.

Additionally, it would be desirable to have a nonwoven web suitable for a wet wipe that exhibits relatively high retention of fluids such as aqueous fluids, and relatively high strength, but remains soft to the skin, with sufficient thickness, texture and porosity for effective skin soil cleaning.

Finally, it would be desirable to have a nonwoven web, suitable for a wet wipe that can be made with a relatively high strength, thickness and softness, without linting, and can be made economically.

SUMMARY OF THE INVENTION

The nonwoven web 10 of the present invention is a layered structure that takes advantage of the beneficial properties of different types of fibers advantageously distributed in each layer. In particular, the present invention is a multi-layer nonwoven web suitable for use as a wet wipe, the web having a first fibrous outer layer comprising from about 10% to about 60% conjugate fiber, from about 20% to about 65% cellulosic fibers, a fibrous inner layer bonded at discrete bond sites to the first outer layer in a face to face relationship comprising from about 10% to about 60% conjugate fiber, and from about 10% to about 90% cellulosic fibers. A second fibrous outer layer, which can be the same composition as the first outer layer, is bonded at discrete bond sites to the inner layer in a face to face relationship. In a currently preferred embodiment each layer also has a certain percentage of multi-component, or conjugate fiber, such as bicomponent fiber.

A method for forming the web of the present invention is also disclosed.

BRIEF DESCRIPTION OF THE INVENTION

DETAILED DESCRIPTION OF THE INVENTION

Figure 1:
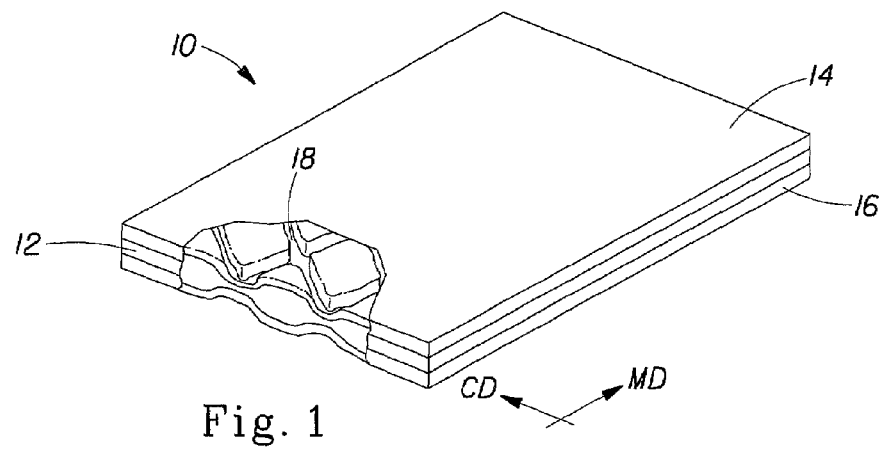
FIG. 1 is a simplified perspective view of one embodiment of a nonwoven web of the present invention utilized as a wet wipe, showing only a portion of the embossed area.

The nonwoven web 10 of the present invention is a layered structure that takes advantage of the beneficial properties of different types of fibers advantageously distributed in each layer. In particular, in a currently preferred embodiment, as shown in FIG. 1, the nonwoven web of the present invention is at least a three-layer structure having at least one relatively high basis weight central layer 12 disposed between two relatively low basis weight outer layers, 14 and 16. By "layer" as used herein is meant a portion of a web that is formed as a discrete web apart from other layers, for example by its own card in a carding operation, prior to being joined to adjacent layers to form a unitary web. A layer is made as a relatively homogeneous web, that is, the constituent fibers are relatively evenly distributed within the layer. Unless otherwise noted all percentages given herein are weight percentages.

When formed by the method of the present invention, the nonwoven web 10 exhibits a good balance of strength, extensibility, thickness, drape, and softness, which are desirable for body-contacting articles, such as linings for disposable diapers and wet wipes. The web 10 also exhibits very low levels of linting, and controlled stretch properties, which makes it particularly useful as a substrate for pre-moistened wipes, otherwise known as wet wipes. However, it is recognized that the nonwoven web 10 can have other useful and beneficial uses as well. Therefore, a wet wipe is taught herein as a preferred, but non-limiting use for the nonwoven web 10.

In a currently preferred embodiment, the constituent outer layers of the nonwoven web 10 are formed by carding. Carding is a mechanical process whereby clumps of staple fibers are separated into individual fibers and simultaneously made into a coherent web. Carding is typically carried out on a machine that utilizes opposed moving beds or surfaces of fine, angled, closely spaced teeth or wires or their equivalent to pull and tease the clumps apart. The teeth of the two opposing surfaces typically are inclined in opposite directions and move at different speeds relative to each other.

In a currently preferred embodiment, the constituent inner layer of the nonwoven web 10 is formed by an air laying process. Air laying is a process whereby air is used to separate, move, and randomly deposit fibers from a forming head to form a coherent, and largely isotropic web. Air laying equipment and processes are known in the art, and include Kroyer or Dan Web devices (suitable for wood pulp air laying, for example) and Rando webber devices (suitable for staple fiber air laying, for example).

The nonwoven web 10 of the present invention and a method of making are now described below with reference to FIGS. 1 and 2, respectively.

The Nonwoven Web

In a currently preferred embodiment, the two outer layers 14 and 16 of nonwoven web 10 are identical, and each will be so described in detail herein with reference to outer layer 14. However, it is recognized that the two outer layers need not have identical compositions, basis weights, or other material properties.

The invention is described below as a three-layer web having a single inner layer with two outer layers. However, it is recognized that there can be more than one inner layer. For example, instead of one airlaid forming head making the inner layer, two or more heads can make up two or more inner layers. However, the percentages for the various properties of the inner layer below can apply to the inner layers as a whole, if more than one inner layer is used between the outer layers.

In the currently preferred embodiment described herein, the nonwoven web 10 is formed without the use of adhesive. That is, the web is formed by a method that does not involve the application of adhesive, and therefore the finished layered unitary web is characterized by the absence of adhesive or an adhesive component. Although in less preferred embodiments an adhesive can be used, in a currently preferred embodiment the layers are held together to form a unitary web only by fiber to fiber thermal bonds. FIG. 1 shows a portion of an embossed area 18 which can be a thermal bond location.

In each layer of the nonwoven web 10 of the present invention a combination of fiber types is utilized to optimize the beneficial properties of each. For example, the outer layers can have a certain percentage of cellulosic fibers to give the web a soft, cloth-like feel; while the inner layer may have a different percentage of the same or similar cellulosic fibers to provide for improved absorbency and thickness. Each layer also has a certain percentage of multi-component, or conjugate fiber, such as bicomponent fiber, to provide for thermal bonding and softness Other fibers, for instance polypropylene, polyester, polypropylene—polyester conjugates and polyester—polyester conjugates fibers may be added in each layer to achieve additional properties such as thickness, softness and drape. In a currently preferred embodiment, the nonwoven web 10 of the present invention comprises the above-mentioned cellulosic and conjugate fibers in predetermined proportions, as described more fully below.

The outer layers 14 and 16 can each make up from about 10% to about 40% of the total basis weight of nonwoven web 10. In one preferred embodiment, each outer layer about 10% to about 30% of the total basis weight of nonwoven web 10, and in a currently preferred embodiment the two outer layers 14 and 16 are identical and each comprise about 18% of the total basis weight of the nonwoven web 10.

The inner layer 12 can make up from about 33% to about 80% of the total basis weight of nonwoven web 10. In a currently preferred embodiment, the inner layer 12 comprises about 62% of the total basis weight of the nonwoven web 10.

The outer layers 14 and 16 should have sufficient quantity of conjugate fibers to permit adequate fiber-to-fiber bonding within the layers, and fiber-to-fiber bonding with fibers in the central layer 12. Adequate fiber-to-fiber bonding is achieved when loose surface fibers are "tied down" such that they are not easily dislodged from the nonwoven web in the form of lint. Therefore, each outer layer can have from about 10% to about 60% conjugate fibers. In one preferred embodiment, each outer layer has about 25% to about 60% conjugate fibers. Without being bound by theory, is believed that 25% of conjugate fibers is the minimum amount necessary to adequately tie down loose surface fibers for consumer-acceptable low-linting wet wipe applications. In a currently preferred embodiment the two outer layers 14 and 16 each comprise about 50% conjugate fibers.

The inner layer 12 should also have sufficient quantity of conjugate fibers to permit adequate fiber-to-fiber bonding, particularly bonding with the fibers of the outer layers.

Although a structure of separate layers permits preferential distribution of fiber types, it remains important that the constituent layers perform as a unitary web when utilized as a wet wipe, particularly in a baby wipe application. Delamination of the layers during use detracts from the consumer benefits delivered from such a wet wipe. Therefore, to avoid delamination of the layers, the inner layer can have from about 10% to about 60% conjugate fibers. In one preferred embodiment, the inner layer has about 15% to about 50% conjugate fibers, and in a currently preferred embodiment the inner layer 12 comprises about 20% conjugate fibers which, without being bound by theory, is believed to be the minimum amount necessary to maintain structural integrity and to prevent delamination in consumer-acceptable wet wipe applications.

The outer layers 14 and 16 should have sufficient quantity of cellulosic fibers to give the nonwoven web 10 a soft, clothlike feel. Each outer layer can have from about 30% to about 65% cellulosic fibers. In one embodiment each outer layer has about 25% to about 70% cellulosic fibers. Without being bound by theory, is believed that 25% cellulosic fibers is the minimum amount that can be used and still deliver a preferred clothlike feel in consumer-acceptable wet wipe applications. In a currently preferred embodiment the two outer layers 14 and 16 each comprise about 50% cellulosic fibers.

The inner layer 12 can have a quantity of cellulosic fibers sufficient to give the nonwoven web 10 adequate absorbency. Especially when used as a wet wipe, each wipe should exhibit sufficient absorbency to absorb and hold aqueous fluids or lotions prior to use. Additionally, fluid, such as urine, should be sufficiently absorbed so as to make the wipe is effective in cleaning tasks associated with baby wipes. The inner layer can have from about 10% to about 100% cellulosic fibers. The inner layer can have about 25% to about 90% cellulosic fibers, and in a currently preferred embodiment the inner layer 12 comprises about 80% cellulosic fibers. In particular, using 80% cellulosic content in the inner layer 12 together with the preferred percentages shown above for the outer layers, gives a total substrate content of about 68% cellulose, which has been found to be beneficial in baby wipe applications. Without being bound by theory, about 40% cellulosic fiber content is believed to be the minimum amount necessary for adequate absorbency in consumer-acceptable wet wipe applications. In one embodiment, the cellulosic content can be a combination of low denier rayon fibers and fluff pulp fibers. A preferred pulp fiber is Foley Fluff available from Buckeye Technologies, Memphis, Tenn.

For each of the layers, the conjugate fibers can be of a core/sheath design, and are preferably comprised of polypropylene (as the core) and polyethylene (as the sheath). In a preferred embodiment for the outer layers, the conjugate fibers can be from about 20 mm to about 60 mm in length, and in a preferred embodiment are about 40 mm in length. A preferred conjugate fiber is a 1.7 dtex, 40 mm fiber available as ES-C PHIL from ES-FiberVisions, Covington, Ga. In a preferred embodiment for the inner layers, the conjugate fibers can be from about 3 mm to about 12 mm in length, and in a preferred embodiment are about 6 mm in length. A preferred conjugate fiber is a 1.7 dtex, 6 mm fiber available as AL-Adhesion C from ES-FiberVisions, Covington, Ga.

For the outer layers the cellulosic fibers can be rayon, and in a preferred embodiment are fibers low denier rayon fibers having a length of between about 20 mm and about 60 mm in length. In a preferred embodiment, the rayon is 1.5 denier fiber having an average length of about 40 mm. A preferred rayon fiber is available as type 18453, available from Acordis Cellulosic Fibers, Axis, Ala.

Method for Making

Figure 2:
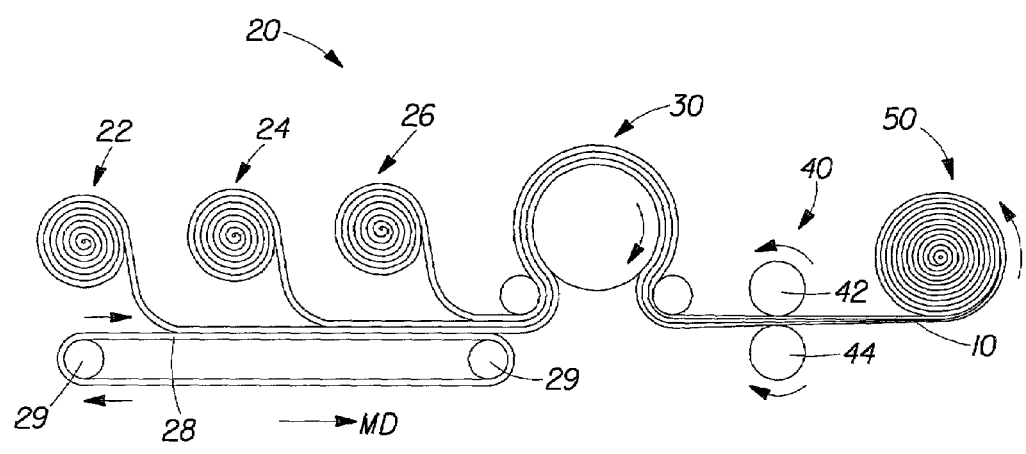
FIG. 2 is a schematic representation of an apparatus for producing a nonwoven web of the present invention.

FIG. 2 shows a schematic representation of an apparatus for use in a preferred method of making the nonwoven web 10 of the present invention. As shown in FIG. 2, the method is a combination a of carding and airlaying processes, with subsequent through-air bonding and calendaring of the multi-layer substrate. Without being bound by theory, it is believed that the sequence of steps in the method described herein with reference to FIG. 2 is important to achieving the beneficial web properties, as described below.

An apparatus, generally designated at 20, comprises a carding apparatus having at least two cards designated at 22 and 26 and one airlay forming head 24. Each component forms a discrete web. Any of these discrete webs could also be supplied as pre-bonded nonwoven roll goods. The first card 22 forms a carded web corresponding to layer 16 as depicted in FIG. 1. Subsequently, the airlay forming head forms a web, layer 12, on top of layer 16. Finally, card 26 forms a carded web, layer 14, which is transferred on top of layer 12.

Each carded web can be formed by carding methods known in the art, and deposited by known methods, such as by doffing, onto a forming belt or screen 28. Each airlaid web can be formed by airlaying methods known in the art, and deposited by known methods onto a forming belt or screen 28. As all three layers are formed on forming screen 28, forming screen 28 is moved in the machine direction MD by rolls 29. In this way, nonwoven web 10 can be formed in a continuous process. The direction of forming is referred to as the machine direction MD, while the width of the web is measured in the cross direction CD.

The fiber composition of the fiber supply for each card and airlaid forming head can be predetermined, formulated and/or adjusted by methods known in the art for supplying mixed fiber cards and airlaying heads. In a preferred process, and to produce a web having properties optimally suited for use as a wet wipe, the fiber compositions can be prepared as follows. For both cards 22 and 26, the preferred fiber composition is 50% Type 18453 rayon and 50% ES-C PHIL PP/PE conjugate fiber, each of which are described above. For the airlay forming head 24, the preferred fiber composition is 80% Foley Fluff and 20% AL Adhesion C conjugate fiber, each of which are described above.

After all three layers of the carded nonwoven web are deposited in a layered relationship, the deposited fibers are moved by forming screen 28 to a thermal treatment apparatus 30. Thermal treatment apparatus 30 can incorporate any of known methods for subjecting the layered web to sufficiently elevated temperatures so as to effect thermoplastic melting of the polyethylene component of the constituent conjugate fibers. Upon cooling, portions of the conjugate fibers remain melt-bonded to portions of adjacent conjugate fibers, thereby forming the three layers into a unitary web having substantially uniform distribution of layer to layer bond sites.

Fiber to fiber thermal bonds are preferably made by a through-air dryer comprising a through-air drying drum 32 which the carded web is transferred onto for a predetermined dwell time. The advantage of using a through-air dryer is that the web is heated sufficiently with little or no compression. In this manner, the constituent layers of the web can be bonded together due to the conjugate fiber-to-conjugate fiber bonding, without unnecessary compression of calendaring rollers, for example. Without wishing to be bound by theory, it is believed that the through-air bonding step tends to "set" the loft of the nonwoven by effecting bonding without unnecessary compression. This "loft setting" produces a bulkier sheet for better thickness in the end product. By using the composition percentages described above, the thickness of the finished product is believed preferred by consumers using the web as a wet wipe.

The through-air thermal bonding process can be carried out by methods known in the art for through-air drying webs, including paper webs. In general, the nonwoven web is guided and removed from screen 28 and placed in contact with a rotating perforated drying drum 32. Hot air of sufficient temperature is forced out of the perforated drying drum 32 and through the nonwoven web being thermally treated. The air temperature, air volume, and machine direction line speed of production can be adjusted to ensure sufficient dwell time for adequate fiber-to-fiber bonding. The actual time, temperature, and line speed can be varied as appropriate, and is not considered to be critical.

After being thermally bonded, the layered, bonded web is then continues for further processing to a calendaring apparatus 40. Calendaring apparatus 40 preferably comprises thermal embossing means to impart an embossed pattern of compressed regions onto the layered, bonded web. The embossing means can include standard embossing patterns and equipment as are known in the art.

By embossing the layered, bonded nonwoven web, the nonwoven web can gain better aesthetics, particularly for use as a wet wipe. However, besides better aesthetics, other beneficial physical characteristics are imparted to the nonwoven web by calendaring. For example, by calendaring the web at sufficiently elevated temperatures additional thermal bonding is achieved in the compressed regions, thereby giving better surface fiber bonding. This surface fiber bonding "ties down" loose fiber, resulting in reduced linting of the finished web. Additionally the thermal bonding of the calendaring operation increases the strength of the nonwoven web 10, especially when used in a wet wipe application. The added embossing also produces a web having a topography that exhibits sufficient texture and porosity for effective skin soil cleaning Finally, the thermal emboss contributes to reducing the available cross-direction CD stretch of the finished web. Excessive CD stretch is often a characteristic of carded webs, and is generally undesirable in a wet wipe. By reducing CD stretch, the stretch properties of the web are more uniform, and more suited for use as a wet wipe.

The thermal embossing can be carried out by suitable methods known in the art. In one embodiment satisfactory results were produced by setting the calendaring apparatus 40 temperatures at 145 degrees Centigrade on the pattern roll 42, and on the anvil roll 44. A nip pressure of about 264 pound per linear inch produces satisfactory results for the preferred web described above, having three layers and a total basis weight of 64 grams per square meter (gsm).

The layered, bonded, and calendared web can then be wound as roll stock on a parent roll 50 for storage or further processing.

While particular embodiments and/or individual features of the present invention have been illustrated and described, it would be obvious to those skilled in the art that various other changes and modifications can be made without departing from the spirit and scope of the invention. Further, it should be apparent that all combinations of such embodiments and features are possible and can result in preferred executions of the invention. Therefore, the appended claims are intended to cover all such changes and modifications that are within the scope of this invention.

What is claimed is:

1. A multi-layer nonwoven web suitable for use as a wet wipe, the web comprising:
    (a) a first carded fibrous outer layer comprising from about 10% to about 60% conjugate fiber, from about 20% to about 65% cellulosic fibers;
    (b) a fibrous inner layer comprising from about 10% to about 60% conjugate fiber, from about 10% to about 90% cellulosic fibers, said inner layer bonded at discrete band sites to said first outer layer in a face to face relationship; and
    (c) a second carded fibrous outer layer comprising from about 10% to about 60% conjugate fiber, from about 20% to about 65% cellulosic fibers, said second fibrous outer layer bonded at discrete bond sites to said inner layer in a face to face relationship.

2. The nonwoven web of claim 1, wherein said first and second outer layer comprise identical fiber compositions.

3. The nonwoven web of claim 1, wherein said first and second outer layers together comprise from about 20% to about 80% of the total basis weight of the web.

4. The nonwoven web of claim 1, wherein said first and second outer layers each comprise from 20% to about 60% of the total basis weight of the web.

5. The nonwoven web of claim 1, wherein said inner layer comprises from about 33% to about 80% of the total basis weight of the web.

6. The nonwoven web of claim 1, wherein said web is formed in the absence of adhesive.

* * * * *

UNITED STATES PATENT AND TRADEMARK OFFICE
CERTIFICATE OF CORRECTION

| | | |
|---|---|---|
| PATENT NO. | : 7,358,204 B2 | Page 1 of 1 |
| APPLICATION NO. | : 09/824454 | |
| DATED | : April 15, 2008 | |
| INVENTOR(S) | : Jonathan Paul Brennan | |

It is certified that error appears in the above-identified patent and that said Letters Patent is hereby corrected as shown below:

<u>Column 2</u>
Line 63, delete the heading "BRIEF DESCRIPTION OF THE INVENTION" and insert -- BRIEF DESCRIPTION OF THE DRAWINGS --.

<u>Col. 8, line 29, Claim 1b</u>
Line 4, delete "band" and insert -- bond --.

Signed and Sealed this

Seventh Day of October, 2008

JON W. DUDAS
*Director of the United States Patent and Trademark Office*